No. 871,648. PATENTED NOV. 19, 1907.
F. STREICH.
DOUGH DIVIDER.
APPLICATION FILED APR. 9, 1906.
2 SHEETS—SHEET 2.
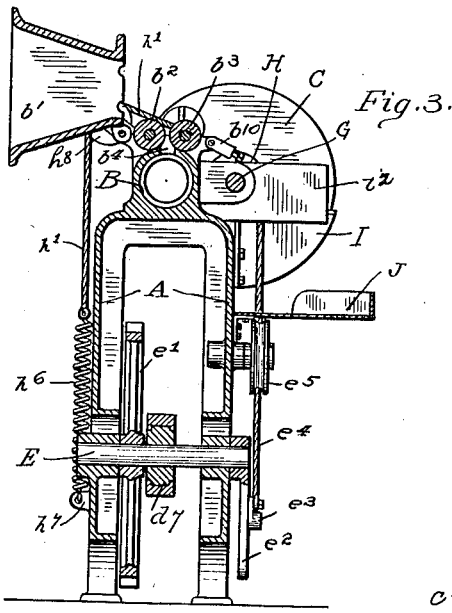
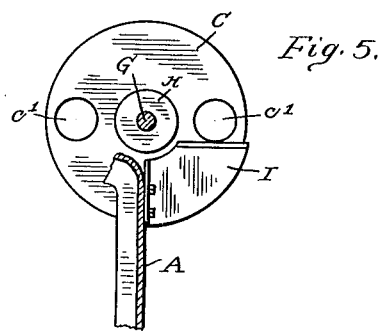
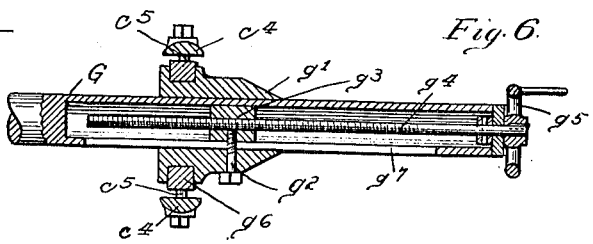
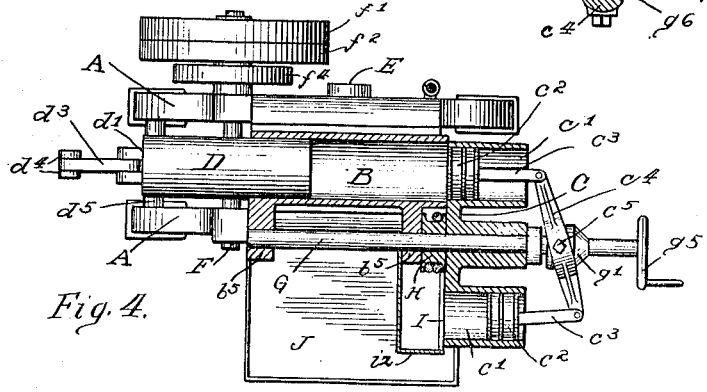
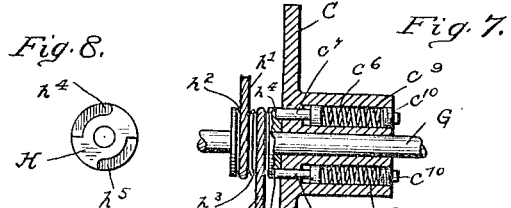
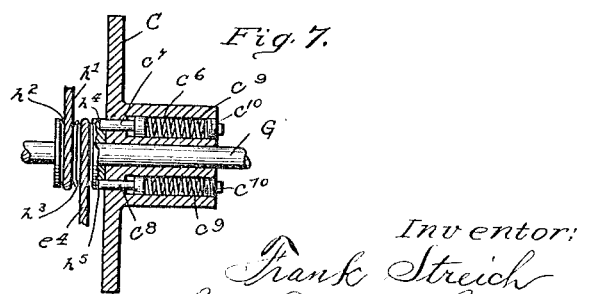
Witnesses:
John Braunwalder
M. A. Milord
Inventor:
Frank Streich
By Frederick Benjamin
Att'y.

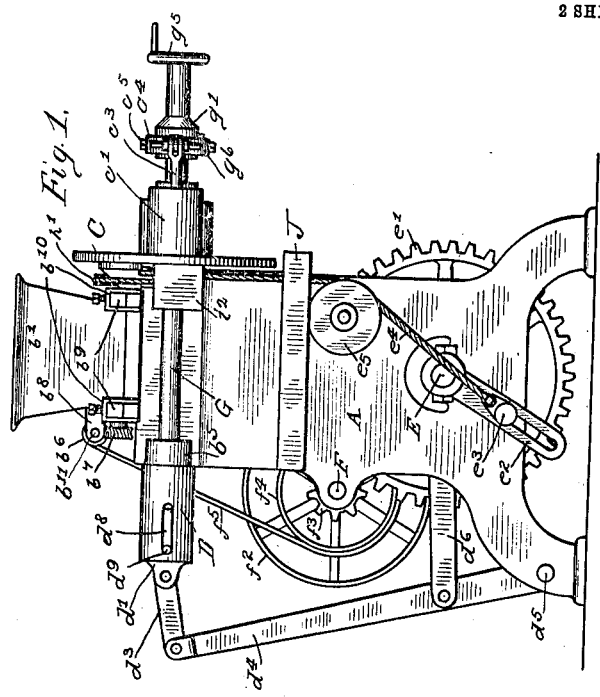

UNITED STATES PATENT OFFICE.

FRANK STREICH, OF JOLIET, ILLINOIS, ASSIGNOR, BY MESNE ASSIGNMENTS, TO CHAMPION MACHINERY COMPANY, OF JOLIET, ILLINOIS, A CORPORATION OF ILLINOIS.

DOUGH-DIVIDER.

No. 871,648.   Specification of Letters Patent.   Patented Nov. 19, 1907.

Application filed April 9, 1906. Serial No. 310,712.

*To all whom it may concern:*

Be it known that I, FRANK STREICH, citizen of the United States, residing at Joliet, in the county of Will and State of Illinois, have invented certain new and useful Improvements in Dough-Dividers, of which the following is a specification.

This invention relates to machines for dividing masses of bread dough or similar substances, into lumps of predetermined size or weight, and the especial object of the invention which forms the subject matter of this application for patent, is to produce a machine of economical construction and easy operation, that will scale or measure the dough with great accuracy and uniformity and that will not impair the texture or quality of the dough during manipulation of the same.

In carrying out the aforegoing and other objects of general utility, I have invented the machine which is shown in a preferred form in the accompanying drawings which form a part of this application, in which:—

Figure 1 is a side elevation of the machine complete; Fig. 2 is a view partly in side elevation and partly in vertical longitudinal section of the machine; Fig. 3 is a vertical cross-section of the machine; Fig. 4 is a horizontal cross-section of the machine; Fig. 5 is a fragmentary detail of the divider-head and the knife that coöperates therewith. Fig. 6 is a longitudinal section on an enlarged scale of the means for varying the sizes of the lumps of dough; Fig. 7 is a sectional detail of the divider-head; Fig. 8 is a detail of a part of a clutch device employed in my machine.

My dough divider comprises generally a supporting frame, a hopper to receive the masses of dough to be divided, means for feeding the dough from the hopper to the dividing chambers, means for controlling the amount of dough entering the measuring chamber, means for accurately adjusting said controlling elements, and means for ejecting the lumps of dough when separated or divided.

Referring to the details of the drawing, A represents the supporting frame of the machine, in the upper portion of which is arranged a cylindrical chamber B which is directly below the hopper $b'$ and is adapted to receive dough from the latter through a passageway $b^4$. The hopper is hinged on the frame so that it may be readily swung out of operative position as shown in Fig. 3, and is locked in operative position by pivoted links $b^{10}$ which engage the hopper feet $b^9$.

Above the passageway $b^4$ are mounted rollers $b^2$, $b^3$, which are journaled in the frame, arranged to occupy the bottom of the hopper when it is in operative position and are rotated toward each other by intermeshing worm $b^{12}$ and worm-gears $b^7$, $b^7$, the latter being fixed on the spindles of the rollers $b^2$, $b^3$, and the former journaled in brackets $b^8$ on the side of the hopper.

Slidably mounted in the cylinder B is a hollow cylindric piston D in the outer end of which is arranged a block $d^1$ in the side of which is a pin $d^9$ which extends through a horizontal slot $d^8$ formed in the side of the piston, thus limiting the movements of the block in the piston. Between the inner end wall of the piston and the inner end of the block is an expansion coiled spring $d^2$ which forms a yielding bearing for the block. To the outer end of the block is connected one end of a link $d^3$ the other end of which is connected with a lever $d^4$ which is pivoted on a frame stud $d^5$, and is connected by a link $d^6$ with an eccentric $d^7$ which is mounted on the driven-shaft E journaled in the frame. The shaft E has fixed thereon a gear-wheel $e^1$ which meshes with a pinion $f^3$ on the drive-shaft F which is journaled in the frame, and the shaft F carries loose and tight pulleys $f^1$, $f^2$, which may be belted to any suitable shaft pulley or power mechanism. On the shaft F between the pulley $f^2$ and the frame, is fixed a pulley $f^4$ for a purpose to be described.

A shaft G is journaled in the frame extensions $b^5$, $b^5$. For a portion of its length this shaft is hollow (see Fig. 6) and is provided with a longitudinal slot $g^7$ in one side. A block $g^3$ is slidably arranged in the shaft G and is bored and threaded to receive a threaded rod $g^4$ which extends through the hollow portion of the shaft, is secured against longitudinal movement at the end of the shaft and has an operating wheel $g^5$ on its outer end.

A sleeve $g^1$ is slidably mounted on the shaft G and is connected with the block $g^3$ by a stud-bolt $g^2$ which passes through the sleeve and enters a threaded hole in the block. The sleeve is formed with an external annular groove into which is loosely fitted a collar $g^6$ on which are pivoted by bolts $c^5$ the yokes $c^4$ which partially embrace the collar. To the outer ends of the yokes are pivoted plunger rods $c^3$, $c^3$, to the free ends of which are secured plungers $c^2$, $c^2$ which are slidably mounted in cylindrical chambers $c^1$ formed integral with a disk C. The disk C is formed in addition to the two cylindrical chambers $c^1$, with a central hub extension which is bored to receive loosely the shaft G (see Fig. 7) on which it is mounted. The hub is also bored on opposite sides of the central bore to form ways $c^6$, $c^6$, for expansion coil springs $c^9$, $c^9$ the outer ends of which bear against screw-plugs $c^{10}$, $c^{10}$ and the other ends against pins $c^7$, $c^7$, which extend through suitable holes in the face of the disk and project therefrom. The pins engage concentric grooves $h^4$, $h^5$, formed in the face of a collar H which is mounted on the shaft G adjacent to the disk. The collar is formed with peripheral grooves $h^3$, about which are wound in opposite directions, ropes $e^4$, $h^1$. The rope $e^4$ extends downwardly over a pulley $e^5$ mounted on a stud-shaft on the frame and its lower end is connected with a stud $e^3$ which is adjustably secured in a slot in an arm $e^2$ fixed on the shaft E. The rope $h^1$ passes over a grooved pulley $h^8$ mounted on a stud-shaft on the upper part of the frame, and has its lower end connected with the upper end of a coil spring $h^6$ the lower end of which is secured to the frame lug $h^7$ (Fig. 3). Bolted to the frame near the disk C is a metal plate I (see Fig. 5) the free edge of which is beveled and in frictional contact with the face of the disk thus serving as a scraper or knife in removing any dough that might adhere to the face of the plungers or the disk. A sheet-iron hood $i^2$ is secured to the frame so as to cover the knife and protect the operator from coming in contact with the knife. Below the hood and in position to catch the lumps of dough when ejected by the plungers $c^2$, is a table J which is bolted to the frame of the machine and extends at right-angles therefrom. From the pulley $f^4$ a belt runs over a pulley $b^6$ on the spindle $b^{11}$ of the worm $b^{12}$ thus transmitting motion to the latter which, as has been stated, drives the worm-gears $b^7$ on the spindles of the rollers $b^2$, $b^3$.

The operation of a machine constructed substantially as described will be as follows:—The shaft F being driven by a suitable belt on the pulley $f^2$, will in turn drive the pulley $f^4$ which, through the belt $f^5$, will drive the worm $b^{12}$ which will rotate the rollers $b^2$, $b^3$, toward each other. The shaft F through the intermeshing gears $f^3$, $e^1$, will drive the shaft E, thus driving the eccentric $d^7$ and the parts $d^6$, $d^4$, $d^3$, and $d^1$, connected therewith. The shaft E will also rotate the arm $e^2$ and thus give a reciprocating movement to the rope $e^4$ and an oscillating motion to the block H with which the rope is connected. The oscillation of the block H will be in part effected by the rope $h^1$ and spring $h^6$. As the block H oscillates on its shaft G it will, through the alternate engagement of the pins $c^7$, $c^8$, with the shoulders at the ends of the grooves $h^4$, $h^5$, cause the disk C to oscillate on the shaft G, and thus bring the chambers $c^1$, $c^1$, alternately opposite the cylinder B and the knife I. Now if a mass of dough is placed in the hopper $b^1$, the rollers will draw a portion of it downwardly between them and force it through the passageway $b^4$ into the cylinder B where it will be acted on by the piston D which, in its forward movements, will force as much of the dough into the chamber then opposite the cylinder as the position of the plunger $c^2$ therein will permit. The stroke of the piston will be so timed relative to the movements of the disk that at each stroke, a chamber will be filled with dough. The oscillation of the disk will serve to cut off the dough in the chamber from that in the cylinder and will carry the lump thus divided around to the opposite side of the machine whereupon the forward movement of the plunger in the filled chamber will eject the dough and it will drop upon the table. This forward movement of the plunger will be produced by the rearward movement of its companion plunger which will be forced rearwardly by the dough being pushed into the chamber by the piston D as above described.

In order to adjust the position of the plungers relative to their respective chambers, whereby the amount of dough entering the chambers may be controlled, I turn the threaded rod $g^4$ by the hand-wheel $g^5$ and thus cause the block $g^3$ and the sleeve $g^1$ secured thereto to slide forwardly or backwardly depending upon the direction in which the rod is turned, thus adjusting both plungers simultaneously and uniformly, and the fineness of adjustment being limited only by the number of threads to the inch on the rod.

After the cylinder B is once filled with dough, the piston in its forward movement will impinge on the dough and if no cushioning or yielding devices were employed in connection with the piston, the gas in the dough would be forced out by the piston pressure and hence the "life" of the dough would be destroyed rendering necessary further fermentation. In my machine I provide for this condition by providing the retreating plungers, the passageway to the rollers, and most effective of all, the spring $d^2$ in the piston. In addition to serving as a cushion for the piston in its pressure on the dough in the cylinder, it also serves to modify the thrust of the block $d^1$ in its forward movement and thus makes the machine easy running or without jars or pounding which would otherwise result from the reciprocation of the piston.

Referring to the utility of my machine, attention is especially invited to the ready accessibility of all parts for cleaning purposes. The piston can be easily removed from the chamber by unscrewing the pin $d^9$ or taking out the pivot connecting $d^3$ with $d^4$; the plungers can be removed from the chambers $c^1$ by merely turning the rod $g^4$ until the plungers clear the chambers thus opening both ends of the cylinder B as well as the chambers. By turning back the hopper the rollers $b^2$, $b^3$, are exposed. Thus every part of the machine that comes in contact with the dough may be quickly, easily and thoroughly cleaned.

Having thus described my invention, what I claim, is:—

1. In a dough dividing machine, a hopper, feeding means arranged in said hopper, a cylinder adapted to receive the dough from said feeding means, a reciprocating piston arranged in said cylinder, an oscillating member having dough measuring chambers, means for oscillating said member, means for reciprocating said piston, and adjustable means for measuring the dough admitted to said chambers.

2. In a machine of the class described, a cylinder adapted to receive the material to be operated on, a hollow reciprocating piston arranged in said cylinder and means within said piston whereby a yielding pressure on the material is effected.

3. In a machine of the class described, a cylinder adapted to receive the material to be operated on, a hollow reciprocating piston removably mounted in said cylinder, a block slidably arranged in said piston and a spring between said block and the piston.

4. In a dough machine, a hopper, feed rollers mounted in said hopper, a chamber adapted to receive from said rollers portions of the dough to be operated on, a plunger slidably arranged in said chamber, a block arranged in said plunger, means for adjusting the stroke of said plunger, and cushioning means for said block.

5. In a dough machine, a chamber adapted to receive portions of the material to be operated on, a piston slidably arranged in said chamber, a lever and cushioning means between said lever and said piston.

6. In a dough dividing machine, an oscillating disk provided with chambers, plungers slidably arranged in said chambers, means for oscillating said disk, means common to said plungers for limiting their stroke, means for forcing dough into said chambers, and means for removing dough from the face of said disk.

7. In a dough dividing machine, an oscillating member having dough measuring chambers formed therein, connected plungers slidably arranged in said chambers and adapted to be operated by the dough forced into said chambers, means for forcing dough into said chambers, and means for regulating the stroke of said plungers.

8. In a machine of the class described, an oscillating member having chambers formed therein, plungers slidably arranged in said chambers, means for oscillating said member, means for regulating the strokes of said plungers, and a knife arranged in contact with the face of said member for the purpose set forth.

9. In a machine of the class described, chambers adapted to receive portions of the material operated on, plungers slidably mounted in said chambers, and means for regulating the stroke of said plungers, said means consisting of a shaft, a sleeve on said shaft and connected with said plungers, and means for adjusting the sleeve longitudinally on the shaft.

10. In a machine of the class described, an oscillating dough receiving member having a plurality of measuring chambers open at their front and rear ends, alternately operating plungers arranged in said chambers, means connecting together said plungers, and means for adjusting said connecting means whereby the stroke of the plungers is controlled.

In testimony whereof I affix my signature in presence of two witnesses.

FRANK STREICH.

Witnesses:
EUGENE H. GARNETT,
FREDERICK BENJAMIN.